(12) United States Patent
Kawachi

(10) Patent No.: US 9,881,754 B2
(45) Date of Patent: Jan. 30, 2018

(54) TOGGLE SWITCH AND SWITCH DEVICE

(71) Applicant: KABUSHIKI KAISHA TOKAI RIKA DENKI SEISAKUSHO, Aichi (JP)

(72) Inventor: Yasuo Kawachi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/081,919

(22) Filed: Mar. 27, 2016

(65) Prior Publication Data
US 2016/0293358 A1 Oct. 6, 2016

(30) Foreign Application Priority Data

Apr. 1, 2015 (JP) ................. 2015-075067

(51) Int. Cl.
*H01H 9/00* (2006.01)
*H01H 23/02* (2006.01)
(Continued)

(52) U.S. Cl.
CPC .......... *H01H 23/025* (2013.01); *G02B 6/002* (2013.01); *G02B 6/0088* (2013.01);
(Continued)

(58) Field of Classification Search
CPC .... H01H 23/025; H01H 23/12; H01H 21/025; H01H 2219/036; H01H 2221/016;
(Continued)

(56) References Cited

U.S. PATENT DOCUMENTS 4,082,934 A 4/1978 Piber
4,613,736 A * 9/1986 Shichijo ................. H01H 11/00
200/308

(Continued)

FOREIGN PATENT DOCUMENTS

CN 183515 A 9/2006
DE 102009037408 A1 2/2011
(Continued)

OTHER PUBLICATIONS

Office Action of Japanese application No. 2015-075067 dated Aug. 30, 2016.

(Continued)

*Primary Examiner* — Renee Luebke
*Assistant Examiner* — Lheiren Mae A Caroc

(57) ABSTRACT

A toggle switch includes a first substrate, a lever, an operation knob, and a light guide. The first substrate includes a first contact, a second contact, and a light source. The lever is configured to pivot in a thickness-wise direction of the first substrate and contact one of the first contact and the second contact. The operation knob is attached to the lever and includes a light outlet. The operation knob receives light, guides the light, and emits the light out of the light outlet. The light guide guides light emitted from the light source to the light outlet. The lever includes a metal plate and a resin plate into which the metal plate is inserted. The resin plate includes an attachment groove that extends in the thickness-wise direction of the first substrate. The light guide is attached to the attachment groove.

8 Claims, 3 Drawing Sheets

(51) Int. Cl.
*H01H 21/02* (2006.01)
*F21V 8/00* (2006.01)
*H01H 23/12* (2006.01)
*H01H 21/22* (2006.01)
*H01H 21/24* (2006.01)
*H01H 23/30* (2006.01)

(52) U.S. Cl.
CPC .......... *H01H 21/025* (2013.01); *H01H 23/12* (2013.01); *H01H 21/22* (2013.01); *H01H 21/24* (2013.01); *H01H 23/30* (2013.01); *H01H 2219/036* (2013.01); *H01H 2219/062* (2013.01); *H01H 2221/016* (2013.01)

(58) Field of Classification Search
CPC .. H01H 21/22; H01H 2219/062; H01H 23/30; H01H 21/24
USPC .......................................... 200/310–313, 315
See application file for complete search history.

(56) References Cited

U.S. PATENT DOCUMENTS

| | | | |
|---|---|---|---|
| 5,561,279 A | 10/1996 | Hattori et al. | |
| 7,105,760 B2 * | 9/2006 | Zensai | G03G 15/5016 200/293 |
| 2006/0021861 A1 | 2/2006 | Schmidt et al. | |
| 2006/0209518 A1 | 9/2006 | Nishimoto et al. | |
| 2013/0223042 A1 | 8/2013 | Kim et al. | |

FOREIGN PATENT DOCUMENTS

| | | |
|---|---|---|
| EP | 1887598 A1 | 2/2008 |
| FR | 2917697 A1 | 12/2008 |
| JP | S57-115137 U | 1/1981 |
| JP | H1-117027 U | 8/1989 |
| JP | H4-123037 U | 11/1992 |
| JP | 2001-347847 A | 12/2001 |
| JP | 2005-310519 A | 11/2005 |
| JP | 2006-66189 A | 3/2006 |
| JP | 2008-293673 A | 12/2008 |

OTHER PUBLICATIONS

Japanese Office Action dated Mar. 14, 2017 issued in the application No. 2015-075067.
Extended European Search Report dated Aug. 3, 2016 issued in the European Patent Application No. 16162775.7.
Chinese Office Action dated Aug. 1, 2017 issued in Chinese Patent Application No. 201610190748.1.

* cited by examiner

TOGGLE SWITCH AND SWITCH DEVICE

CROSS-REFERENCE TO RELATED APPLICATIONS

This application is based upon and claims the benefit of priority from prior Japanese Patent Application No. 2015-075067, filed on Apr. 1, 2015, the entire contents of which are incorporated herein by reference.

FIELD

The present invention relates to a toggle switch and a switch device.

BACKGROUND

A known toggle switch includes a lever that shifts between a first position and a second position so that a shaft of the lever comes into contact with a first contact or a second contact arranged on a substrate.

Japanese Laid-Open Patent Publication No. 2005-310519 describes a toggle switch that includes a lever and a substrate. The longitudinal direction of the lever is the same as the longitudinal direction of the substrate. Thus, the lever and the substrate are substantially parallel to each other. This reduces the size of the toggle switch in a thickness-wise direction of the substrate.

However, for the type of toggle switch such as that described in Japanese Laid-Open Patent Publication No. 2005-310519, there is a demand for further reduction in size, or miniaturization, in the thickness-wise direction of the substrate. When operating a miniaturized toggle switch, strength against the load applied to the lever needs to be ensured.

Japanese Laid-Open Patent Publication No. 2006-66189 describes a recent switch that includes a substrate provided with a light source. The light of the light source is emitted from an operation knob. This facilitates operation of the switch in dark situations. However, if the substrate of Japanese Laid-Open Patent Publication No. 2005-310519 is provided with a light source, the light source and the operation knob would be located in different positions in the thickness-wise direction of the substrate. Thus, the light of the light source cannot be emitted from the operation knob. To solve this problem, a light guide may be used. However, this would increase the number of components and enlarge the entire toggle switch.

SUMMARY

One aspect of the present invention is a toggle switch that includes a first substrate, a lever, an operation knob, and a light guide. The first substrate includes a first contact, a second contact, and a light source. The lever is configured to pivot in a thickness-wise direction of the first substrate and contact one of the first contact and the second contact. The operation knob is attached to the lever and includes a light outlet. The operation knob receives light, guides the light, and emits the light out of the light outlet. The light guide guides light emitted from the light source to the light outlet. The lever includes a metal plate and a resin plate into which the metal plate is inserted. The resin plate includes an attachment groove that extends in the thickness-wise direction of the first substrate. The light guide is attached to the attachment groove.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a switch device that includes a toggle switch according to the present invention will now be described with reference to the drawings.

Figure 1:
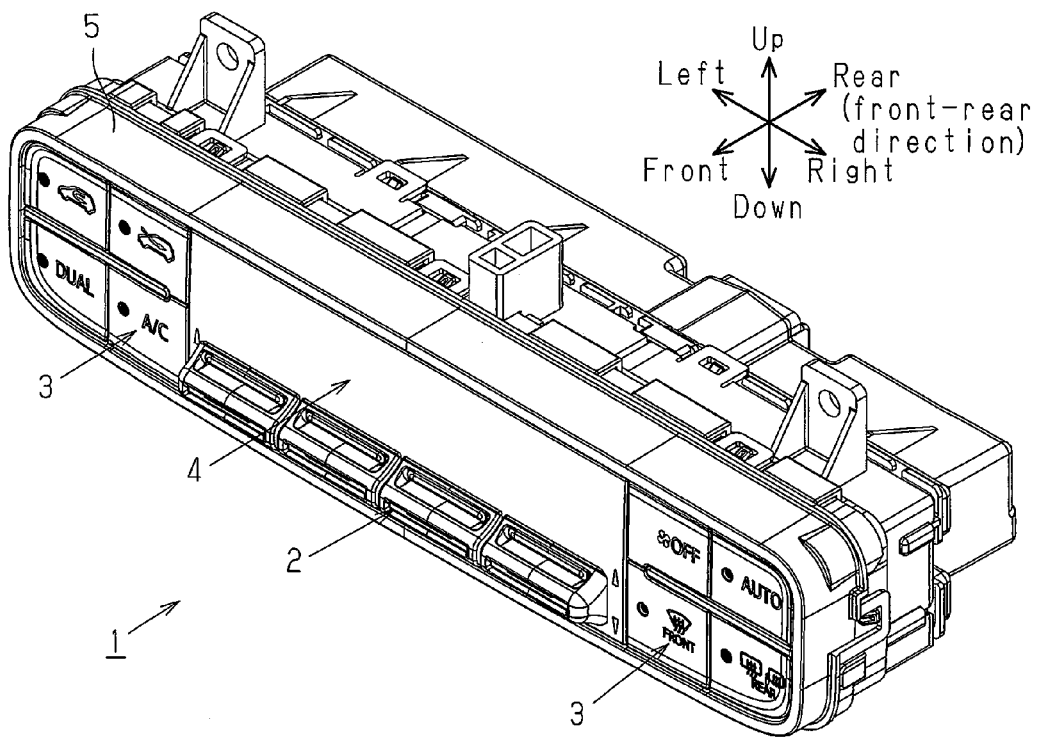
FIG. 1 is a perspective view of a switch device.
Figure 2:
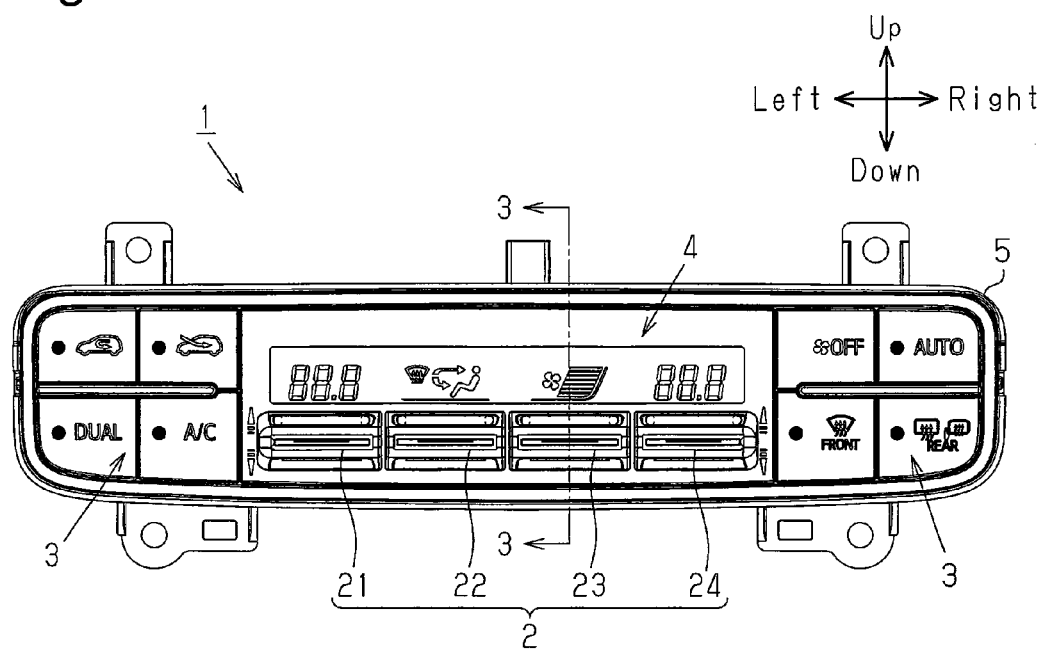
FIG. 2 is a front view of the switch device.

As shown in FIGS. 1 and 2, a switch device 1 includes a toggle switch portion 2, two push switch portions 3, a display 4, and a case 5. The toggle switch portion 2, the two push switch portions 3, and the display 4 are attached to the case 5. The case 5 is, for example, generally box-shaped and formed from a resin. The two push switch portions 3 are arranged on two longitudinal ends of the case 5. The toggle switch portion 2 is located in a middle portion of the case 5 between the two push switch portions 3. The toggle switch portion 2 is arranged along a lower edge of the case 5. The display 4 is located between the two push switch portions 3 above the toggle switch portion 2. The display 4 is arranged along an upper edge of the case 5.

The switch device 1 is installed, for example, in a center console or an instrument panel of a vehicle. The toggle switch portion 2, the push switch portions 3, and the display 4 are electrically connected to an air-conditioning controller that controls the air conditioner of the vehicle. The user of the vehicle operates the toggle switch portion 2 and the push switch portions 3 to change the air-conditioning setting. The display 4 shows information related to the air conditioner of the vehicle. The user sees the information shown on the display 4 to obtain information related to the air-conditioning.

The toggle switch portion 2 includes four toggle switches 21, 22, 23, 24 arranged in a longitudinal direction of the case 5. The four toggle switches 21 to 24 all have the same structure. Thus, only the toggle switch 23 will be described as a representative example.

Figure 3:
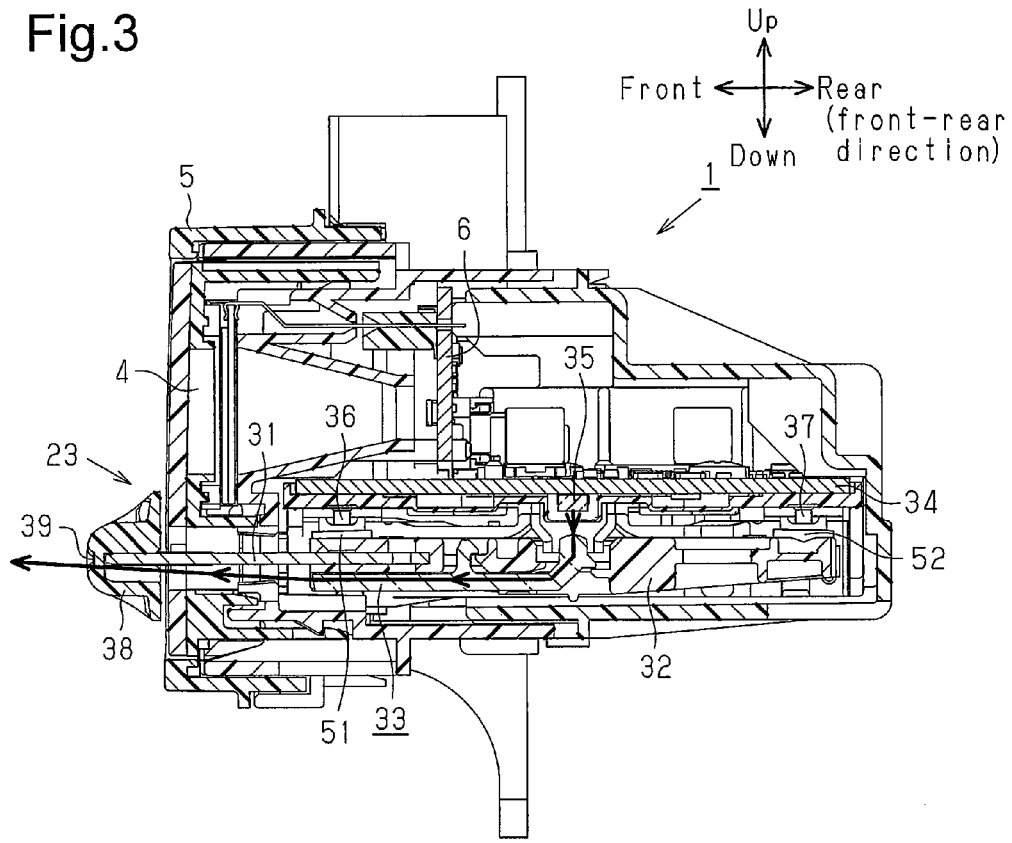
FIG. 3 is a cross-sectional view taken along line 3-3 in FIG. 2.
Figure 4:
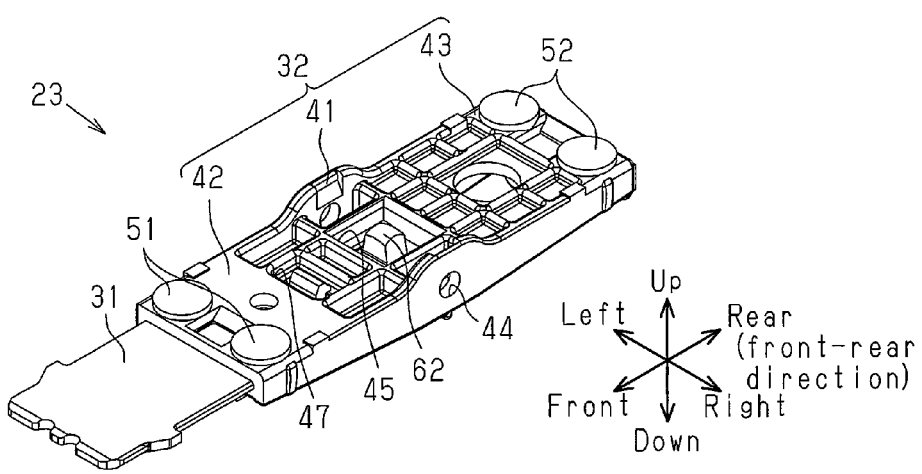
FIG. 4 is a perspective view of a toggle switch.

As shown in FIGS. 3 and 4, the toggle switch 23 includes a metal plate 31, a resin plate 32, a light guide 33, and a substrate 34. The metal plate 31 and the resin plate 32 form a lever.

The switch device 1 includes a substrate 6 arranged in the case 5. The substrate 6 is substantially parallel to the surface of the display 4. The substrate 6 is electrically connected to the push switch portions 3 and the display 4. The substrate 34 is supported by the case 5 below the substrate 6 so that the substrate 34 and the substrate 6 extend in intersecting direction. In other words, the substrate 34 is arranged to be orthogonal to an imaginary plane extending downward from the substrate 6. A first contact 36, an LED 35, and a second contact 37 project from the lower surface of the substrate 34. More specifically, the substrate 34 includes a mount surface 34a on which the first contact 36, the LED 35, and the second contact 37 are mounted. The first contact 36, the LED 35, and the second contact 37 are arranged, for example, in this order from locations closer to the display 4. The distance between the first contact 36 and the LED 35 is set to be the same as the distance between the LED 35 and the second contact 37. The substrate 34 corresponds to a first substrate. The substrate 6 corresponds to a second substrate.

The metal plate 31 is a plate formed from a metal. The metal plate 31 includes a basal end inserted into the resin plate 32 through insert molding so that the metal plate 31 and the resin plate 32 are substantially parallel to each other. The metal plate 31 includes a distal end, which is located at a side opposite to the basal end. An operation knob 38 is attached to the distal end. For example, the metal plate 31 is arranged to be substantially parallel to the substrate 34, the metal plate 31 is generally box-shaped and elongated in a direction extending from the basal end toward the distal end, and the operation knob 38 is formed from a resin.

The operation knob 38 includes a light outlet 39 arranged adjacent to a lower portion of the metal plate 31. The light outlet 39 receives the light generated in the case 5, for example, light emitted from the LED 35, and releases the light out of the case 5. For example, the operation knob 38 is formed from a transparent resin, and a coating is applied to the outer surface of the operation knob 38. Irradiation of at least a portion of the outer surface of the operation knob 38 with a laser beam removes the coating and forms the light outlet 39. The light outlet 39 may be a physical groove.

The resin plate 32 is a plate formed from a resin. The resin plate 32 includes a front portion 42, into which the basal end of the metal plate 31 is inserted, a rear portion 43, which is located at a side opposite to the front portion 42, and a middle portion 41, which is located between the front portion 42 and the rear portion 43. The resin plate 32 is generally box-shaped and elongated in a direction extending from the front portion 42 toward the rear portion 43. The longitudinal direction of the resin plate 32 conforms to the longitudinal direction of the metal plate 31. The resin plate 32 has a thickness that is gradually reduced from the middle portion 41 toward the front portion 42 and the rear portion 43. More specifically, in the resin plate 32, the middle portion 41 is thicker than the front portion 42 and the rear portion 43.

Pivot holes 44 extend through the middle portion 41 of the resin plate 32 in a direction orthogonal to the longitudinal direction. The pivot holes 44 are arranged, for example, in two opposite edges of the middle portion 41 extending in the direction orthogonal to the longitudinal direction of the resin plate 32. The case 5 includes a cylindrical shaft (not shown) projecting in the longitudinal (sideward) direction of the case 5. The diameter of the pivot holes 44 is slightly greater than the diameter of the cylindrical shaft of the case 5. When the cylindrical shaft of the case 5 is inserted through the pivot holes 44, the resin plate 32 is pivotally supported by the case 5. The position of the cylindrical shaft corresponds to the position of the LED 35 in the longitudinal (front-rear) direction of the resin plate 32.

Figure 6A:
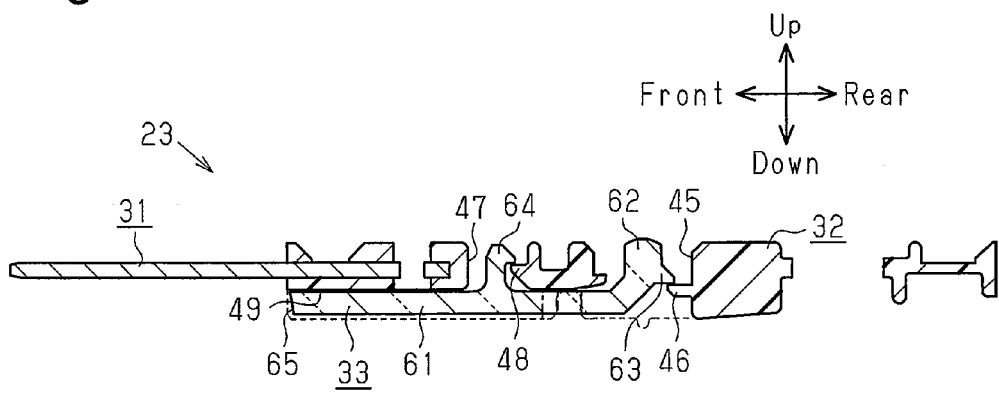
FIGS. 6A to 6C are cross-sectional views taken along line 6-6 in FIG. 5.

As shown in FIG. 6A, a first attachment hole 45 extends through the middle portion 41 in the thickness-wise (vertical) direction. The first attachment hole 45 is preferably located in the middle of the middle portion 41 with respect to the direction (lateral direction) orthogonal to the longitudinal direction of the resin plate 32. A first projection 46 projects toward the metal plate 31 (frontward) from a wall defining the first attachment hole 45. The first projection 46 is located in the first attachment hole 45 at a side opposite to the LED 35. As shown in FIG. 4, the first attachment hole 45 and the pivot holes 44 are located at the same position in the longitudinal (front-rear) direction of the resin plate 32. More specifically, the first attachment hole 45 is located below the LED 35. The first attachment hole 45 receives light from the LED 35. The first attachment hole 45 corresponds to a through hole.

As shown in FIG. 6A, a second attachment hole 47 extends in the thickness-wise (vertical) direction through the middle portion 41 at a border with the front portion 42. A second projection 48 projects toward the metal plate 31 (frontward) from a wall defining the second attachment hole 47. The second projection is located in the second attachment hole 47 at a side opposite to the LED 35.

As shown FIG. 4, the basal end of the metal plate 31 is inserted into the front portion 42. Additionally, two first pressing portions 51 project from an upper surface of the front portion 42. The upper surface is opposed to the LED 35. The distance from the two first pressing portions 51 to the pivot holes 44 is the same as the distance from the first contact 36 to the LED 35.

Figure 5:
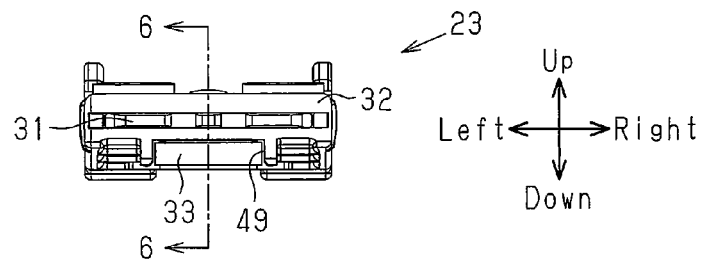
FIG. 5 is a front view of the toggle switch.

As shown in FIGS. 5 and 6A, an attachment groove 49 extends through the lower surfaces of the middle portion 41 and the front portion 42. The attachment groove 49 extends from the first attachment hole 45 of the middle portion 41 via the second attachment hole 47 and to an edge of the front portion 42 into which the metal plate 31 is inserted.

As shown in FIG. 4, two second pressing portions 52 project from an upper surface of the rear portion 43. The distance from the two second pressing portions 52 to the pivot holes 44 is the same as the distance from the LED 35 to the second contact 37.

As shown in FIG. 6A, a light guide 33, which is a plate, includes a body 61 and a light collector 62. The body 61 is generally box-shaped and elongated in a direction (front-rear direction) extending from the metal plate 31 toward the resin plate 32. The light collector 62 extends upward from the end of the body 61 located closer to the resin plate 32. The light guide 33 is formed from a transparent resin and is, for example, an acrylic plate.

Referring to FIG. 5, the thickness of the body 61 is set to be slightly smaller than the depth (dimension in vertical direction) of the attachment groove 49. The dimension of the body 61 in a direction (lateral direction) orthogonal to the longitudinal direction is set to be slightly smaller than the width (dimension in lateral direction) of the attachment groove 49. The dimension of the body 61 in the longitudinal (front-rear) direction is set to be slightly smaller than the dimension of the attachment groove 49 in the longitudinal (front-rear) direction.

The height (dimension in vertical direction) of the light collector 62 is set to be slightly greater than the depth (dimension in vertical direction) of the first attachment hole 45. Thus, the distal end of the light collector 62 projects above the first attachment hole 45 and is opposed to the LED 35. Additionally, a first engagement projection 63 projects from a wall of the light collector 62 at a portion opposed to the resin plate 32.

A second engagement projection 64 projects from an upper surface of the body 61. The second engagement projection 64 includes a distal end that is bent toward the resin plate 32 (rearward). The distance between the first engagement projection 63 and the second engagement projection 64 is set to be the same as the distance between the first projection 46 and the second projection 48.

As shown in FIG. 3, the acrylic light guide 33 receives light from one end and emits the light from the other end. More specifically, light entering the first attachment hole 45 from the LED 35 is received by the light collector 62. The light that enters the light collector 62 is emitted from a front end of the body 61, which defines an emission portion 65. When emitted from the emission portion 65, the light enters the light outlet 39 of the operation knob 38, which is located frontward from the emission portion 65, and is emitted frontward from the light outlet 39.

The process for attaching the light guide 33 to the resin plate 32 will now be described.

Figure 6B:
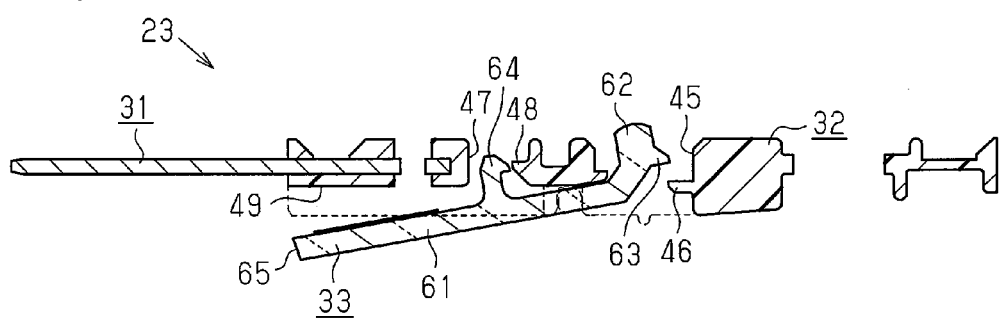
Figure 6C:
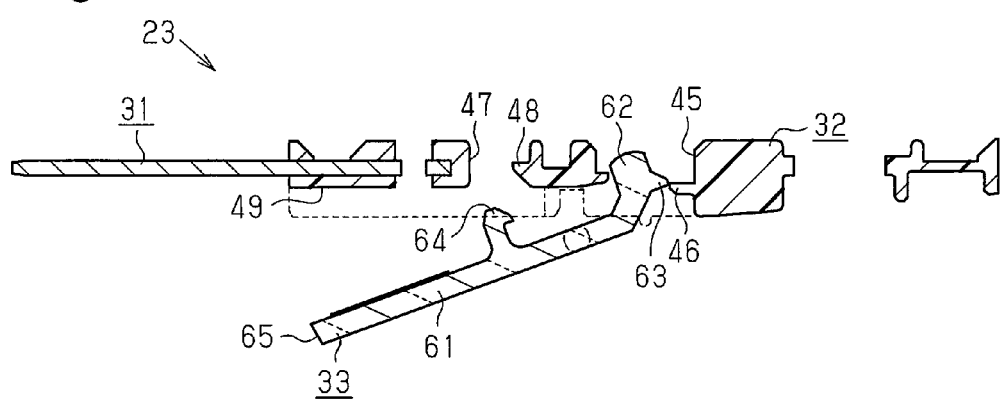

As shown in FIG. 6C, the light collector 62 is fitted into the first attachment hole 45 from a lower side of the resin plate 32. This engages the first engagement projection 63 with the first projection 46.

Then, the light guide 33 is rotated clockwise about a position where the first engagement projection 63 is engaged with the first projection 46. Consequently, as shown in FIG. 6A, after the state shown in FIG. 6B, the body 61 is accommodated in the attachment groove 49, and the second engagement projection 64 is fitted into the second attachment hole 47. Additionally, the second engagement projection 64 is engaged with the second projection 48. This attaches the light guide 33 to the resin plate 32.

Accordingly, the present embodiment has the effects and advantages described below.

(1) The attachment groove 49 extends through the lower surface of the resin plate 32. The attachment groove 49 accommodates the light guide 33. This miniaturizes the toggle switch 23 in the vertical direction, or the thickness-wise direction of the substrate 34. Additionally, the metal plate 31, which is thinner than the resin plate 32 and has superior strength, is inserted into the resin plate 32. This miniaturizes the toggle switch 23 in the vertical direction. The light guide 33 allows light to be emitted from the light outlet 39 of the operation knob 38. Thus, the toggle switch 23 is easy to operate even in dark situations.

(2) The light collector 62 of the light guide 33 is fitted into the first attachment hole 45. The position of the first attachment hole 45 in the front-rear direction corresponds to the pivot holes 44. Additionally, the first attachment hole 45 is located below the LED 35. Even when the toggle switch 23 is pivoted, the movement of the light collector 62 is small. This stably guides light from the LED 35 to the light outlet 39 regardless of the pivoting of the toggle switch 23 as indicated by the solid arrows in FIG. 3. Thus, the toggle switch 23 is easy to operate even in dark situations.

(3) When attaching the light guide 33 to the resin plate 32, the light collector 62 is fitted into the first attachment hole 45 from the lower side of the resin plate 32, and the first engagement projection 63 is engaged with the first projection 46. Then, the light guide 33 is rotated clockwise about the position in which the first engagement projection 63 is engaged with the first projection 46. Consequently, the second engagement projection 64 is fitted to the second attachment hole 47 and engaged with the second projection 48. Such rotational attachment limits warping of the light guide 33.

(4) The metal plate 31 is located between the light guide 33 and the display 4. The light emitted from the light guide 33 and received by the light outlet 39 that leaks upward, or toward the display 4, is limited. This allows the display 4 to be viewed properly.

(5) The substrate 34 of the toggle switch 23 extends in a direction intersecting the substrate 6 of the push switch portions 3 and the display 4. This reduces the size of the entire switch device 1 in the directions in which the substrate 34 extends, that is, the lateral direction and the front-rear direction.

It should be apparent to those skilled in the art that the present invention may be embodied in many other specific forms without departing from the scope of the invention. Particularly, it should be understood that the present invention may be embodied in the following forms.

In the embodiment, the substrate 34 does not necessarily have to extend in a direction intersecting the substrate 6.

In the embodiment, the light guide 33 may be located above the metal plate 31. Even in such a structure, advantages (1) to (3) of the embodiment can be obtained.

In the embodiment, the light guide 33 is attached to the resin plate 32 when rotated about the portion where the first engagement projection 63 is engaged with the first projection 46. However, the light guide 33 may be attached through a process performed without rotating the light guide 33.

In the embodiment, the light collector 62 is located at a position corresponding to the pivot holes 44 in the front-rear direction. Instead, the light collector 62 may be located at another position. Even in such a structure, advantage (1) of the embodiment can be obtained.

In the embodiment, the attachment groove 49 is located in the lower surface of the resin plate 32. Instead, the attachment groove 49 may be located in the upper surface of the resin plate 32.

In the embodiment, the vertical dimension of the light collector 62 is set to be slightly greater than the vertical dimension of the first attachment hole 45. Instead, the vertical dimension of the light collector 62 may be set to be the same as or slightly less than the vertical dimension of the first attachment hole 45. If the vertical position of the distal end of the light collector 62 corresponds to the vertical position of the pivot holes 44, movement of the distal portion of the light collector 62 is small when the toggle switch 23 pivots. More specifically, the light collector 62 can stably collect more light from the LED 35. This, in turn, further stabilizes the amount of light discharged from the emission portion 65.

In the above embodiment, the push switch portions 3 and the display 4 may be omitted from the switch device 1. The positions of the components, that is, the toggle switch portion 2, the push switch portions 3, and the display 4, in the switch device 1 of the embodiment are one example and may be appropriately changed.

In the embodiment, the light guide 33 does not have to be acrylic. There is no limit to the type and material of the light guide 33 as long as it has light-guiding properties.

In the embodiment, the light source is not limited to the LED 35. That is, various kinds of light source may be used instead of the LED 35.

The present examples and embodiments are to be considered as illustrative and not restrictive, and the invention is not to be limited to the details given herein, but may be modified within the scope and equivalence of the appended claims.

What is claimed is:
1. A toggle switch comprising:
a first substrate including a first contact, a second contact, and a light source;
a lever configured to pivot in a thickness-wise direction of the first substrate and contact one of the first contact and the second contact;

an operation knob attached to the lever and including a light outlet, wherein the operation knob receives light, guides the light, and emits the light out of the light outlet; and
a light guide that guides light emitted from the light source to the light outlet, wherein
the lever includes a metal plate and a resin plate into which the metal plate is inserted,
the resin plate includes an attachment groove that extends in the thickness-wise direction of the first substrate, and
the light guide is attached to the attachment groove.

2. The toggle switch according to claim 1, wherein
the lever includes a center of pivot and a through hole that extends through the lever at the center of pivot in the thickness-wise direction of the first substrate, wherein the through hole is continuous with the attachment groove;
the light source is opposed to the center of pivot of the lever,
the light guide includes a body attached to the attachment groove and a light collector that is continuous with the body,
the light collector extends in the thickness-wise direction of the first substrate and collects light, and
the light guide is attached to the lever with the light collector fitted into the through hole.

3. The toggle switch according to claim 2, wherein
the lever includes a first projection, an attachment hole, and a second projection,
the first projection projects from an inner wall defining the through hole in the lever,
the attachment hole is continuous with the attachment groove at a position separated from the through hole of the lever,
the attachment hole extends through the lever in the thickness-wise direction of the first substrate,
the second projection projects from an inner wall defining the attachment hole in the lever,
the light guide includes a first engagement projection and a second engagement projection,
the first engagement projection projects from the light collector and engages with the first projection,
the second engagement projection projects from an upper surface of the body and engages with the second projection, and
the light collector is fitted to the through hole and engaged with the first engagement projection and the first projection, the light guide is rotated about a portion where the light collector is engaged with the first engagement projection and the first projection, and the second engagement projection is fitted into the attachment hole and engaged with the second projection to attach the light guide to the lever.

4. The toggle switch according to any one of claims 1 to 3, wherein
the first substrate includes a mount surface on which the first contact, the second contact, and the light source are mounted,
the lever is opposed to the mount surface of the first substrate, and
the lever extends in a longitudinal direction that is substantially parallel to the mount surface of the first substrate.

5. The toggle switch according to claim 4, wherein
the operation knob is located on a first end of the lever with respect to the longitudinal direction,
the lever includes a first pressing portion and a second pressing portion,
the first pressing portion is arranged on a second end of the lever, which is located at a side opposite to the first end,
the first pressing portion contacts the first contact, and
the second pressing portion is located between the operation knob and the first pressing portion and contacts the second contact.

6. A switch device comprising:
a case; and
a plurality of toggle switches according to claim 1 and attached to the case, wherein
the lever of each toggle switch is pivotally attached to the case, and
the operation knob of each toggle switch extends out of the case.

7. The switch device according to claim 6, further comprising:
a display attached to the case above the toggle switches, wherein presentation shown on the display changes in accordance with operation of the toggle switches,
wherein the metal plate is located between the light guide and the display.

8. The switch device according to claim 7, further comprising:
at least one push switch attached to a portion of the case adjacent to the display; and
a second substrate electrically connected to the display and the at least one push switch,
wherein the first substrate is coupled to the case so that the first substrate extends in a direction intersecting the second substrate.

* * * * *